UNITED STATES PATENT OFFICE.

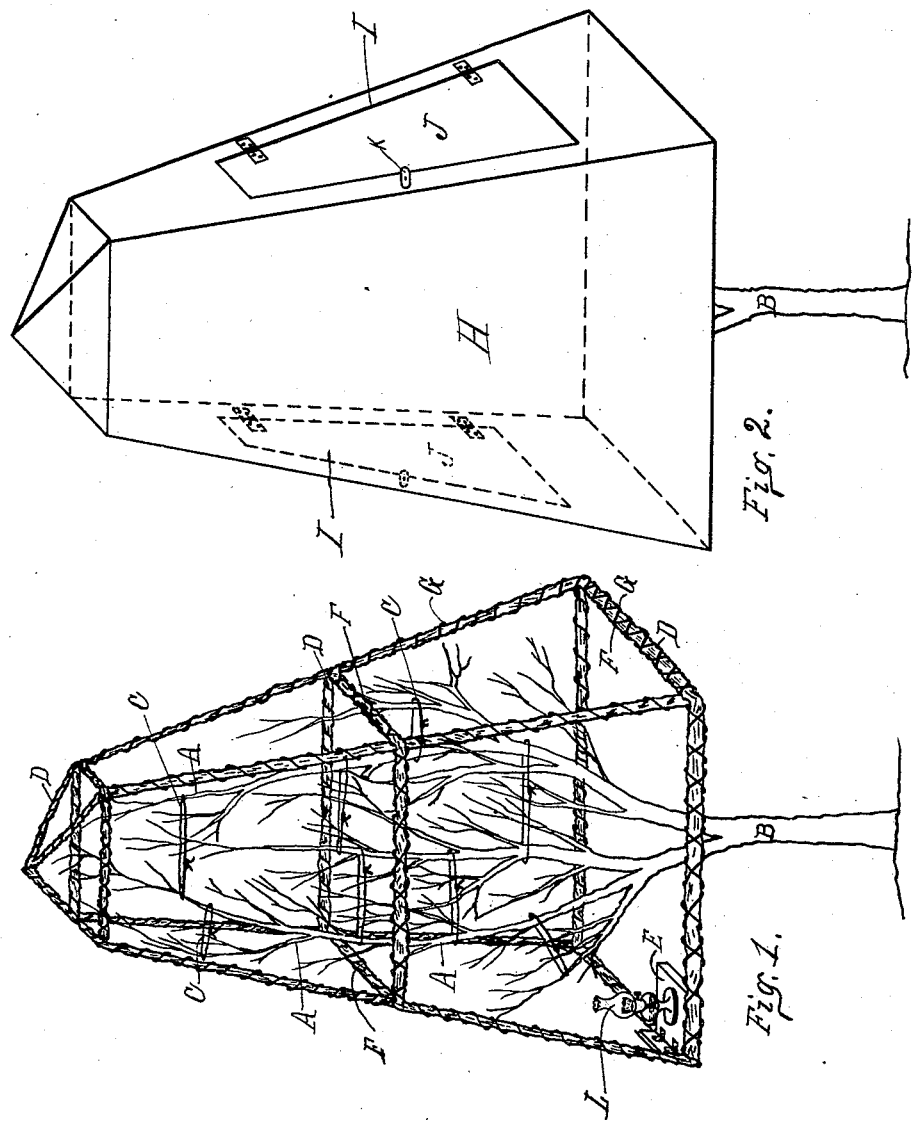

JOHN E. BOURNE, OF SOMERVILLE, OHIO.

FRUIT-BUD PROTECTOR.

SPECIFICATION forming part of Letters Patent No. 461,204, dated October 13, 1891.

Application filed January 16, 1891. Serial No. 377,954. (No model.)

*To all whom it may concern:*

Be it known that I, JOHN E. BOURNE, of Somerville, Butler county, Ohio, have invented certain new and useful Improvements in Fruit-Bud Protectors, of which the following is a specification.

My invention relates to protectors for the buds of fruit-trees to keep them from being frozen during excessively-cold weather, especially in the late spring-time after the buds have been swollen by preceding mild weather.

My improvements consist of cords to connect the limbs of a fruit-tree together in a symmetrical or compact form; a light framework of wood, wire, or other suitable material, preferably in form the frustum of a pyramid or cone, inclosing said tree-top; a hood or covering of suitable material removably placed on said frame, and a lamp placed within said frame and hood to regulate the temperature therein.

My invention will be readily understood from the following description, taken in connection with the accompanying drawings, in which—

Figure 1 is a perspective view of the frame inclosing a tree-top; Fig. 2, a perspective view of the hood or covering for said frame.

In the accompanying drawings, A represents the limbs composing a tree-top and containing thereon the fruit-buds; B, the trunk or body of said tree; C, cords connecting limbs A together in a symmetrical and compact form; D, a light frame-work of wood, wire, or other suitable material, preferably in form the frustum of a pyramid or cone, with downwardly-diverging sides and an open bottom, to be easily placed over the tree-top and to receive the covering-hood, a pointed or rounded apex being desirable on said frame; E, a horizontal shelf or bracket hinged near the bottom of frame D and on the inside thereof, capable of being folded upward and outward while said frame is being put in place on said tree-top; F, some suitable soft material attached by cords G or otherwise to the inner side of the parts composing said frame to avoid abrading the bark or buds of limbs A that may come in contact therewith; H, a hood or cover of such form and size as to fit snugly on the outside of frame D and composed of paper, muslin, or other flexible material, so as to be closely packed when not in use on said frame, and said hood should be painted or prepared in any manner to make it impervious to moisture and to prevent the air from easily passing through it; I, ventilators or openings in the opposite sides of said hood H; J, doors hinged to swing open or to close said openings, as desired; K, buttons to retain said doors in place when closed; L, a lamp placed on bracket E to increase and regulate the temperature within hood H when in position on frame D.

At any convenient time previous to expected severely-cold weather the peach or fruit tree tops are tied together with cords C in the desired form. Frames D are then placed thereon, to remain until the termination of cold weather, to be then removed and stored away for use the following year. When the cold freezing weather arrives, hoods H are placed on their respective frames, doors J are closed, and lamps L lighted, to be kept burning to modify the temperature within the hoods until the weather moderates sufficiently to permit the removal of said hoods or the ventilating of same by opening doors J without danger of freezing the buds on limbs A.

A thermometer is usually suspended within each hood during the time the lamps are burning to indicate the temperature within said hoods, which temperature may be regulated as desired by said lamps. The ventilators I and doors J therefor may be dispensed with and the hoods be removed from the frames entirely when ventilation becomes necessary as the weather moderates, the same to be easily replaced as desired.

Frames D may be so constructed as to be easily separable in parts, to be closely packed for storage. The hoods, being of canvas or flexible material, may be closely folded to occupy small space when not in use.

For very large trees more frames than one to each tree may be conveniently used by properly tying the limbs in separate masses therefor.

As the fruit-killing weather is usually of short duration and occurs in late spring-time after preceding mild weather, the cost of my protectors and the short time devoted to their use are a comparatively small investment for the preservation of a season's peach or other fruit crop.

My protectors are equally efficacious or applicable to the protection of the buds of isolated trees as for those arranged in compact groves or orchards.

Having thus fully described my invention, what I claim, and desire to secure by Letters Patent, is—

1. In a fruit-bud protector, the combination, with a frame adapted to inclose and be entirely supported by a tree, of a cover fitted upon the frame and removable therefrom, and a bracket secured to the inner side of the frame for the support of a lamp for regulating the temperature within the frame and cover, substantially as described.

2. In a fruit-bud protector, the combination, with a frame, of a soft material attached to the inner side of the parts thereof, a bracket hinged near the bottom of the frame and adapted to be folded upward and outward when the frame is being placed upon a tree, and a cover fitted over the frame, having ventilators in its sides and removable from the frame, substantially as described.

JOHN E. BOURNE.

Witnesses:
 ISRAEL WILLIAMS,
 ALEX. F. HUME.